US007469631B2

(12) United States Patent
Sanchez De Leon Rodriguez Roda

(10) Patent No.: US 7,469,631 B2
(45) Date of Patent: Dec. 30, 2008

(54) DEVICE FOR CLEANING THE FILTER PIPES USED TO EXTRACT FRUIT JUICE

(75) Inventor: Juan Antonio Sanchez De Leon Rodriguez Roda, Valencia (ES)

(73) Assignee: Food Machinery Española, S.A., Valencia (ES)

( * ) Notice: Subject to any disclaimer, the term of this patent is extended or adjusted under 35 U.S.C. 154(b) by 0 days.

(21) Appl. No.: 11/694,062

(22) Filed: Mar. 30, 2007

(65) Prior Publication Data

US 2008/0235903 A1 Oct. 2, 2008

(51) Int. Cl.
*A23N 1/00* (2006.01)

(52) U.S. Cl. ............................ 99/510; 99/495; 99/509; 100/98 R; 100/108; 100/213

(58) Field of Classification Search ........... 99/509–513, 99/349–351, 495; 100/98 R, 213, 108, 215, 100/218, 245, 125; 210/514, 470, 307, 335; D7/665, 666
See application file for complete search history.

(56) References Cited

U.S. PATENT DOCUMENTS

| | | | | | |
|---|---|---|---|---|---|
| 4,309,943 | A | * | 1/1982 | Larsen et al. | 99/509 |
| 4,376,409 | A | * | 3/1983 | Belk | 99/509 |
| 4,700,620 | A | * | 10/1987 | Cross | 99/510 |
| 4,922,813 | A | * | 5/1990 | Compri | 99/510 |
| 5,070,778 | A | * | 12/1991 | Cross et al. | 99/510 |

* cited by examiner

*Primary Examiner*—Timothy F. Simone
(74) *Attorney, Agent, or Firm*—Beem Patent Law Firm

(57) ABSTRACT

Device for cleaning the filter pipes used to extract fruit juice, consisting of a cylindrically shaped tube (1) that runs telescopically through the inside of the filter pipe (2), and some circumferential openings (3) have been made at one end of this interior tube (1) through which previously injected pressurized air is expelled along its entire length. The interior tube (1) includes an air inlet (5) that has been provided at one end, and this air inlet (5) is connected to a surrounding chamber (6) with the same configuration as the interior tube (1) and in turn is connected to the openings (3) that this tube has at its other end for cleaning the filter pipe (2).

4 Claims, 1 Drawing Sheet

DEVICE FOR CLEANING THE FILTER PIPES USED TO EXTRACT FRUIT JUICE

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The object to which the invention protected by this patent refers is a "Device for cleaning the filter pipes used to extract fruit juice", which enables the extraction of fruit juice in conventional machines without the need to interrupt the process every once in awhile.

2. Description of Related Art

The known procedure for extracting juice from fruit, in particular citric fruits, is to introduce the fruit in a machine that performs this function. To this end, the fruit is channeled and pushed by feed forks to receptacles that receive the fruit, where the fruit is deposited. At the same time, this machine is provided with other receptacles that are located above and are vertically aligned with the receptacles that receive the fruit and that move vertically to trap the fruit.

A cutter then makes a circular incision at the top and bottom of the piece of fruit and, when the upper and lower receptacles compress and squeeze the fruit, the juice exits through a filter pipe located below the receptacles towards a juice collector.

The filter pipe into which the fruit juice enters has holes all along its surface that become obstructed when the fruit pulp gets stuck in them. Therefore the machinery has to be stopped every once in awhile (approximately every 6 or 7 hours) to clean the filter pipe, thus diminishing the performance and autonomy of this machinery.

BRIEF DESCRIPTION OF THE INVENTION

The purpose of the invention that comprises the object of this patent is to eliminate the structural and functional drawbacks inherent in the above described object, and it has been designed and developed in keeping with this preeminent purpose.

The device covered by the patent consists of a cylindrically shaped tube that runs telescopically through the inside of the filter pipe, and some circumferential openings have been made at one end of this interior tube through which previously injected pressurized air is expelled along its entire length.

Although the injection of air is specified, any type of fluid can be injected into the interior tube that will perform the same function and will succeed in keeping all the holes of the filter pipe clean, expelling all the impurities that, during the normal process phase, stick to these holes made along the filter pipe.

In this way, the filter pipe is automatically cleaned, which enables the machine to run uninterruptedly throughout its work cycle. In addition, the performance of this machine is considerably enhanced, with the resulting improvement of its autonomy.

BRIEF DESCRIPTION OF THE SEVERAL VIEWS OF THE DRAWINGS

To complement the description of the invention and to facilitate interpretation of the structural and functional features of its object, drawings are attached hereto that schematically show a preferential execution of the device for cleaning the filter pipes used to extract fruit juice that comprises the object of this patent. In these drawings.

DETAILED DESCRIPTION OF THE INVENTION

Figure 1:
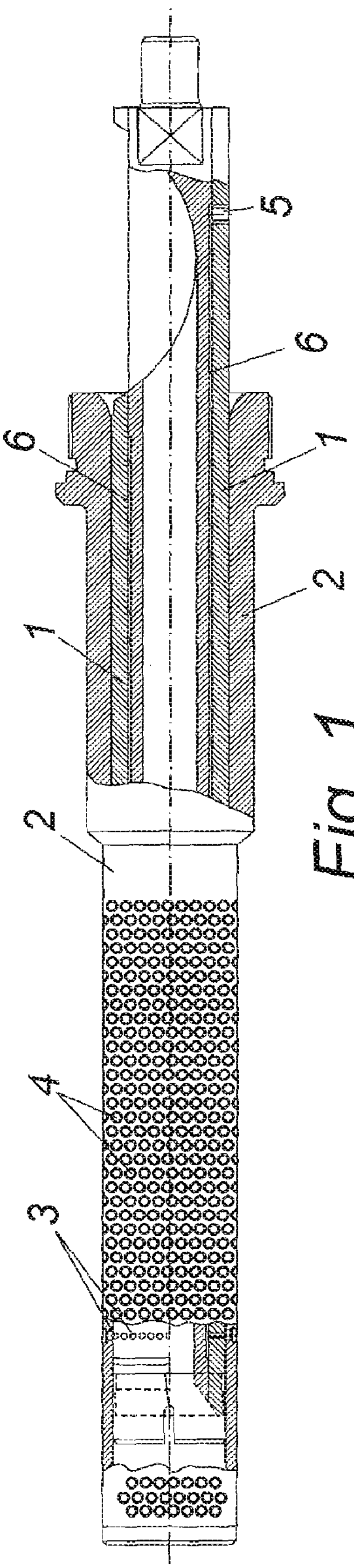
FIG. 1 shows a section of the unit formed by the filter pipe and the interior tube for cleaning it.
Figure 2:
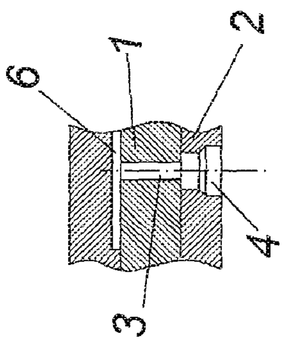
FIG. 2 shows a detail of the filter pipe holes and their connection to the opening where the pressurized air exits.
Figure 3:
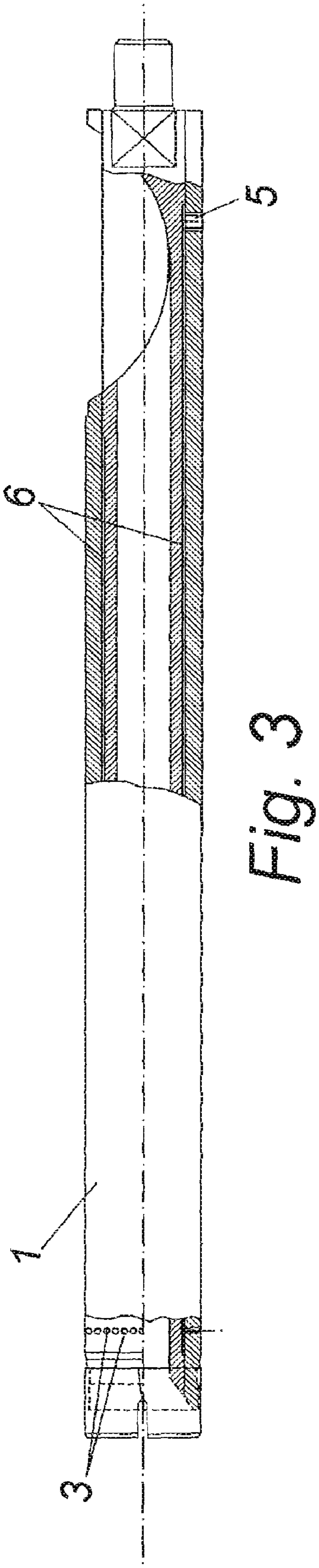
FIG. 3 shows a section of the interior tube that runs through the inside of the filter pipe.

To clearly show the nature and scope of the advantageous application of the device for cleaning filter pipes that comprises the object of the claimed invention, following is a description of its structure with reference to the drawings which, because they represent a preferential execution of this object on an informative basis, should be considered in the broadest sense of the word and not as limitative of the application and the content of the claimed invention.

The device for cleaning the filter pipes used to extract fruit juice is composed of a cylindrically shaped tube (1) that runs telescopically through the inside of the filter pipe (2), and some circumferential openings (3) have been made at one end of this interior tube (1) through which pressurized air is expelled along its entire length, expelling the impurities that stick to the holes (4) made all along the surface of the filter pipe (2).

The pressurized air inlet (5) has been provided at one end of the interior tube (1), in such a way that it is connected to a surrounding chamber (6) with the same configuration as the interior tube (1), and which in turn is connected to the openings (3) that the interior tube (1) has at its other end for cleaning the filter pipe (2).

Although the injection of air is specified, any type of fluid can be injected into the interior tube (1) that will perform the same function and will succeed in keeping all the holes (4) of the filter pipe clean, expelling all the impurities that, during the normal process phase, stick to these holes made along the surface of the filter pipe (2).

What is claimed is:

1. A device for cleaning a filter pipe used to extract fruit juice, said filter pipe having a plurality of holes defined therein, said device comprising:

a cylindrically shaped tube that runs radially inward of the filter pipe, said tube having a first end, at least one inlet for a fluid proximate said first end, and a plurality of circumferential openings such that said circumferential openings and said holes are in fluid communication; and a chamber radially inward of said tube such that said chamber is configured to channel the fluid therethrough along a length of said tube between said inlet and said circumferential openings and holes.

2. A device according to claim 1, wherein said chamber has the same configuration as said tube.

3. A device according to claim 1, wherein the fluid is air.

4. A device according to clam 1, wherein said tube further comprises an outlet spaced from said first end.

* * * * *